United States Patent [19]
Gall

[11] 3,762,476
[45] Oct. 2, 1973

[54] SUBTERRANEAN FORMATION PERMEABILITY CORRECTION

[75] Inventor: James W. Gall, Bartlesville, Okla.

[73] Assignee: Phillips Petroleum Company, Bartlesville, Okla.

[22] Filed: Jan. 3, 1972

[21] Appl. No.: 215,123

[52] U.S. Cl.............. 166/294, 166/270, 166/273, 166/295
[51] Int. Cl................. E21b 33/138, E21b 43/22
[58] Field of Search............ 166/294, 295, 270, 166/273, 300

[56] References Cited
UNITED STATES PATENTS

| 3,554,287 | 1/1971 | Eilers et al............................ 166/295 |
|---|---|---|
| 3,378,070 | 4/1968 | Wessler et al. ................. 166/294 X |
| 3,396,790 | 8/1968 | Eaton................................... 166/270 |
| 3,421,584 | 1/1969 | Eilers et al.......................... 166/295 |
| 3,611,733 | 10/1971 | Eilers et al...................... 166/294 X |
| 3,658,129 | 4/1972 | Lanning et al.................. 166/294 X |
| 3,687,200 | 8/1972 | Routson.......................... 166/295 X |

*Primary Examiner*—Stephen J. Novosad
*Attorney*—Quigg & Oberlin

[57] ABSTRACT

A method for reducing the quantity of water recovered from a subterranean formation which is penetrated by at least one well bore wherein the formation permeability to water is corrected, yielding prolonged mobility control and/or plugging, achieved through injecting aqueous polymer solutions interspaced with ionic solutions of polymer-complexing cations and brine.

8 Claims, No Drawings

SUBTERRANEAN FORMATION PERMEABILITY CORRECTION

This invention relates to a method for correcting the water permeability of well bore-penetrated subterranean formations. In another aspect this invention relates to prolonging mobility control and/or plugging of a well bore-penetrated subterranean formation through applications of thickened aqueous solutions and controlled gelation thereof.

The art is aware that the production of large amounts of water from oil wells and gas wells constitutes one of the major items of expense in the overall recovery of hydrocarbons therefrom. Many oil wells will produce a gross effluent comprising 80–98 percent by volume of water and only 2–20 percent by volume of oil. Most of the pumping energy therefore is expended in lifting water from the well, and therefore the production effluent must be put through expensive separation procedures to recover water-free hydrocarbons. The remaining foul water constitutes a troublesome and expensive disposal problem. It is therefore highly desirable to decrease the volume of water produced from oil wells and gas wells, this being the major object of the present invention. But, by decreasing the flow rate of water into the well bore without decreasing the flow rate of hydrocarbons, another beneficial effect is obtained in that, at any given pumping rate, there will be a lower liquid level over the pump in the well bore, thus reducing backpressure in the formation and improving pumping efficiency and net daily oil production.

Undesired water recovered from well bore-penetrated subterranean formations can result from the infiltration of naturally occurring subterranean water or, in the case of waterflooding projects, from injected water. Either source of water leads to lower efficiency in producing the desired hydrocarbons from the formation. In the application of waterflooding to hydrocarbon reservoirs, poor sweep efficiency often leads to disappointing results. Solutions of water thickeners have been developed, for example, high molecular weight polymers in water solutions, which yield improved results. However, such solutions are expensive and do not yield effective permeability reduction of desired permanence.

It is an object of this invention to provide a method for reducing the quantity of water produced from a well bore-penetrated, subterranean formation. It is another object of this invention to provide a method for prolonging the mobility control and/or plugging through the application of thickened aqueous solutions and controlled gelations thereof.

Broadly, the invention comprises injecting into a subterranean formation through a well bore a first thickened aqueous solution, a complexing ionic solution, a brine slug, a second thickened aqueous solution, terminating the injection of the second aqueous solution, and recovering hydrocarbon fluids from the subterranean formation. Following the injection of the second thickened aqueous solution into the formation, the well is placed back on production under the same conditions that were employed prior to the treatment. A substantial reduction in the water-hydrocarbon ratio into the well bore. Although the immediate effect of the method of this invention is to decrease the quantity of water recovered from a well bore-penetrated subterranean formation, a secondary effect is increasing the absolute daily production rate of hydrocarbons.

The method of this invention provides a prolonged high residual resistance factor through the application of multiple slugs of thickened aqueous polymer solutions interspaced with brine and polymer-complexing ionic solutions. The resulting residual resistance factor achieved by the method of the invention is greater than that produced by single thickening agent solution treatments or combinations thereof without the interspaced polymer-complexing ionic solution.

For the purposes of this invention, "residual resistance factor" will be defined as the mobility to brine before thickener, divided by the mobility to brine after thickener; and "resistance factor" will be defined as the mobility to brine before polymer, divided by the mobility to polymer solution. Resistance factor is of interest during injection, while residual resistance factor demonstrates the final results after injection applications.

In the application of waterflooding projects, the extent of the water division depends upon the magnitude of the residual resistance factor, wherein the higher the residual resistance factor, the more the water is diverted from the high-permeability zones into lower-permeability zones. The duration of the water diversion depends upon the duration of the high value of the residual resistance factor. The increased residual resistance factor will increase the degree of water diversion as long as the factor is maintained, therefore determining the duration of the water diversion.

Channeling of large volumes of water through oil-depleted high-permeability zones and fractures continues to be a problem faced by the hydrocarbon industry. For example, an isolated high-permeability zone can be plugged at the well bore, but a communicating high-permeability zone must be plugged in depth to prevent water from merely flowing around the narrow plug and back into the high-permeability zone; therefore, the need for the method according to the invention of applying thickened aqueous solutions interspaced with complexing ions which promotes controlled gelation of the polymer-thickened solutions.

The method according to the invention provides for decreasing the permeability of high-permeability zones involving sequential injection of polymer-thickened solutions and chemically complexing multivalent metal ions which are controlled with retarding anions. Suitable polymers can be selected from the group consisting of polyacrylamides, partially hydrolyzed polyacrylamides, polysaccharides, carboxymethylcellulose, polyvinyl alcohol, polystyrene sulfonates, and the like. These polymers can be utilized in solutions of fresh water or brines, and the slugs are separated by materials in accordance with the invention, i.e., complexing ionic solutions having from 25 ppm to about 10,000 ppm of a multivalent metal cation selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$, complexed with from about 25 to about 10,000 ppm of retarding anions selected from the group consisting of acetate, nitrilotriacetate, tartrate, citrate, and phosphate. The complexing ionic solution can be injected after the first polymer-thickened solution injection, or may be combined with the interspacing brine slug before the injection of the second polymer-thickened solution. Repeated third and fourth polymer solutions interspaced with brine slugs can be utilized according to the field conditions and requirements thereof.

The first and second aqueous solutions containing the polymer thickeners can be selected from, for example, a partially hydrolyzed polyacrylamide having a molecular weight in excess of 200,000 and having from about 3 to about 75 percent of the amide groups thereof hydrolyzed to carboxyl groups. The first and second polymer-thickened solutions can be the same or any combination of the polymers listed hereinabove as well as variations of the specific partially hydrolyzed polyacrylamides and degree of hydrolyzation thereof.

A well workover according to the method of this invention can be treated with, for example, from about 1,000 to about 3,000 barrel slugs of the first and subsequent polymer-thickened solutions. The workover solutions can have a polymer concentration of from about 200 to about 10,000 ppm depending upon the viscosity desired. Inert materials such as ground walnut hulls, asbestos, leather, etc., can be added to the polymer solutions and act as filler or backbone for a filter cake producing thereby low water loss.

In a preferred embodiment of the method of this invention, a study of combinations of polyacrylamides with aluminum salts to obtain water diversion effects, sequential injection of partially hydrolyzed polyacrylamides, aluminum citrate, and brine solutions has been shown to decrease substantially the brine permeability of Nacatoch No. 5 sand packs over that of the thickened aqueous polyacrylamide solution alone. For example, injection of 250 ppm of the partially hydrolyzed polyacrylamide solutions followed by 270 ppm aluminum ion complex with 950 ppm citrate ion at a pH range of from 4 to 9, decreased brine permeability of a 400 md sand pack by a factor of 26. Following the partially hydrolyzed polyacrylamide solution with 2,700 ppm aluminum ion similarly complexed with 9,500 ppm citrate decreased permeability of another pack by only a factor of 18, but a second treatment with the same partially hydrolyzed polyacrylamide solution further decreased the permeability of this pack to give an overall decrease by a factor of 290. The data included in Examples I and II hereinbelow illustrate the sequential injections and applications according to the method of the invention. Example I illustrates the method according to the invention through laboratory methods while Example II illustrates a field application according to the method of the invention.

EXAMPLE I

Flow tests have been made in cores from Morichal Group I sands using solutions of polyacrylamides having from 15 to 30 percent of the amide groups thereof hydrolyzed to carboxyl groups and molecular weights in excess of 10,000,000. These polymer solutions were used in combination with aluminum cirate in order to simulate treatment of producing wells for the purpose of reducing water-to-oil ratios. Treatment of a core having an effective water permeability of 13 darcys with a 1500-ppm solutions of a partially hydrolyzed (10–40 percent) polyacrylamide in combination with an aluminum citrate (500 ppm aluminum) solution, both solutions in simulated Morichal River water (about 40 ppm dissolved salts) as solvent, resulted in a residual resistance factor of 8.9 after elution with 70 pore volumes of simulated brine and a residual resistance factor of 4.7 after 170 pore volumes.

EXAMPLE II

The insitu crosslinking of partially hydrolyzed polyacrylamide with aluminum citrate in laboratory porous media to decrease water mobility has shown sufficient promise to be considered in specific oil reservoirs, either to increase oil displacement in waterflooding by diverting water from high-permeability strata or to decrease the water-oil ratio of producing wells. The treatment comprises (1) injection of 250–1500 ppm partially hydrolyzed (15–25 percent) polyacrylamide solution to any desired penetration, (2) injection of a 500-ppm solution of aluminum as aluminum citrate, followed by (3) another injection of polyacrylamide solution. The trivalent aluminum ion evidently links the first adsorbed layer of polymer to the subsequently injected polymer to produce a gel structure which decreases permeability to water, and the citrate complexes the aluminum to prevent premature precipitation. In Berea sandstones containing residual crude oil saturation, the additive system has decreased the permeability to water by factors of 15 to 30 while decreasing permeability to oil only by a factor of 2.

While particular embodiments of the invention have been described, it will be understood that the invention is not limited thereto, since many modifications can be made, and it is intended to include within the invention any such modifications as fall within the scope of the claims.

What I claim is:

1. A method for reducing the quantity of water recovered from a subterranean formation which is penetrated by at least one well bore, comprising:
   a. injecting into the formation through a well bore a first aqueous polymer solution;
   b. thereafter injecting a complexing ionic solution of multivalent cations and retarding anions, said complexing ionic solution being comprised of aluminum citrate and capable of gelling said polymer solution;
   c. injecting brine;
   d. thereafter injecting into the formation through the well bore a second aqueous polymer solution said second aqueous polymer solution being capable of being gelled by said complexing ionic solution;
   e. terminating the injection of the second aqueous polymer solution; and
   f. recovering hydrocarbon fluids from the subterranean formation.

2. A method according to claim 1 wherein the first and second aqueous polymer solutions are comprised of from about 200 to about 10,000 ppm of a polymer selected from the group consisting of polyacrylamide, partially hydrolyzed polyacrylamide, polysaccharides, carboxymethylcellulose, polyvinyl alcohol, and polystyrene sulfonates; and the complexing ionic solution is comprised of from about 25 to about 10,000 ppm of the multivalent cations s selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$, and from about 25 to about 10,000 ppm of retarding anions selected from the group consisting of acetate, nitrilotriacetate, tartrate, citrate, and phosphate.

3. A method according to claim 1 wherein the ionic solution has a pH in the range of from about 3 to 11.

4. A method according to claim 3 wherein the polymer is comprised of a partially hydroyzed polyacrylamide.

5. A method according to claim 1 wherein the first and second aqueous polymer solutions are comprised of the same polymer.

6. A method according to claim 1 wherein the first and second aqueous polymer solutions are comprised of different polymers.

7. A method according to claim 1 wherein steps (c) and (d) are repeated.

8. A method according to claim 1 wherein steps (b) and (c) are combined.

* * * * *

UNITED STATES PATENT OFFICE

CERTIFICATE OF CORRECTION

Patent No. 3,762,476
Dated: October 2, 1973

James W. Gall

It is certified that error appears in the above-identified patent and that said Letters Patent are hereby corrected as shown below:

Column 4, lines 60-62, delete "s selected from the group consisting of $Fe^{2+}$, $Fe^{3+}$, $Al^{3+}$, $Ti^{4+}$, $Zn^{2+}$, $Sn^{4+}$, $Ca^{2+}$, $Mg^{2+}$, and $Cr^{3+}$"; lines 63-65, delete "retarding anions selected from the group consisting of acetate, nitrilotriacetate, tartrate," and ", and phosphate".

Signed and sealed this 9th day of July 1974.

(SEAL)
Attest:

McCOY M. GIBSON, JR.
Attesting Officer

C. MARSHALL DANN
Commissioner of Patents